US007817985B2

(12) United States Patent
Moon

(10) Patent No.: US 7,817,985 B2
(45) Date of Patent: Oct. 19, 2010

(54) ELECTRONIC TRANSACTION SERVICE IN A MOBILE COMMUNICATION NETWORK

(75) Inventor: Jong-Joo Moon, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 470 days.

(21) Appl. No.: 11/340,960

(22) Filed: Jan. 27, 2006

(65) Prior Publication Data
US 2006/0166645 A1 Jul. 27, 2006

(30) Foreign Application Priority Data
Jan. 27, 2005 (KR) .................. 10-2005-0007549

(51) Int. Cl.
H04M 11/00 (2006.01)
H04B 5/00 (2006.01)
H04B 1/18 (2006.01)
H04B 10/00 (2006.01)

(52) U.S. Cl. .................. 455/406; 455/41.1; 455/151.2; 379/56.3

(58) Field of Classification Search ................ 455/41.1, 455/41.2, 41.3, 406, 407, 408, 151.2; 379/56.3
See application file for complete search history.

(56) References Cited

U.S. PATENT DOCUMENTS

2003/0119554 A1 6/2003 Horn
2004/0199474 A1* 10/2004 Ritter ........................ 705/65
2005/0083846 A1* 4/2005 Bahl ......................... 370/236

FOREIGN PATENT DOCUMENTS

| CN | 1237048 A | 12/1999 |
|---|---|---|
| CN | 1225225 | 10/2003 |
| CN | 1296344 | 5/2005 |
| GB | 2345825 A | 7/2000 |
| JP | 2001-53882 | 2/2001 |
| JP | 2001-092786 | 4/2001 |
| JP | 2002-269485 | 9/2002 |
| JP | 2003-76837 | 3/2003 |

(Continued)

OTHER PUBLICATIONS

Cardwave, "How will credit card companies cope with the mobile phone having a payment function", issue 7, Jul. 2003.

(Continued)

Primary Examiner—Nick Corsaro
Assistant Examiner—Shannon R Brooks
(74) Attorney, Agent, or Firm—Lee, Hong, Degerman, Kang & Waimey

(57) ABSTRACT

A mobile communication terminal wirelessly coupled to at least one mobile communication network comprising a memory for storing user payment information; a first modem for communicating over a first mobile communication network to provide the user payment information to the memory; a second modem for a communicating over a second mobile communication network to read the user payment information from the memory, when performing an electronic transaction over the second mobile communication network; and a transmitter for transmitting the user payment information in a wireless data format, wherein power applied to the first modem is changed from a first state to a second state after providing the user payment information to the memory.

16 Claims, 4 Drawing Sheets

FOREIGN PATENT DOCUMENTS

| | | |
|---|---|---|
| JP | 2003-527703 | 9/2003 |
| JP | 2004-252751 | 9/2004 |
| JP | 2004336719 | 11/2004 |
| KR | 10-0432462 | 11/1999 |
| KR | 1019990082642 | 11/1999 |
| KR | 10-2000-0070485 A | 11/2000 |
| KR | 1020000070485 | 11/2000 |
| KR | 1020050041703 | 4/2005 |
| KR | 10-2005-0041703 A | 5/2005 |
| WO | WO9742783 * | 11/1997 |
| WO | WO 9742783 A | 11/1997 |
| WO | 03/067851 | 8/2003 |

OTHER PUBLICATIONS

Journal of Electornic Information and Communication Society, "The next-generation mobile communication" vol. 82 No. 2, Feb. 1999.

* cited by examiner

ELECTRONIC TRANSACTION SERVICE IN A MOBILE COMMUNICATION NETWORK

CROSS REFERENCE TO THE RELATED APPLICATION

This application claims the benefit of the Korean Patent Application No. 10-2005-0007549, filed on Jan. 27, 2005, which is hereby incorporated by reference herein in entirety.

FIELD OF THE INVENTION

The present invention relates to an electronic transaction method, and more particularly, to a mobile communication terminal for electronic transactions.

BACKGROUND OF THE INVENTION

Wireless communication networks are evolving from the second generation (2G) wireless technology to the third generation (3G). Hence, a mobile communication terminal may be provided with both a 2G modem for the 2G communications and a 3G modem for the 3G communications. An example of performing an electronic transaction using the mobile communication terminal equipped with both of the 2G and 3G modems is provided below.

When a mobile communication terminal attempts an electronic transaction with a credit terminal via the 2G mobile communication network, a universal subscriber identity module (USIM) of the mobile communication terminal is used to provide or patch payment information of a user of the mobile communication terminal.

In patching the user payment information, the USIM receives a credit card number corresponding to the user payment information via the 3G-modem. Thereafter, the credit card number is sent to the credit terminal via an IrDA transmitter. Thus, in case of attempting the electronic transaction in a 2G mobile communication network, a 3G modem is needed. Since both the 3G-modem as well as the 2G modem are turned on, power is wasted and the electronic transaction is delayed.

FIG. 1 is a block diagram of a mobile communication terminal for electronic transaction according to the related art. As shown, a mobile communication terminal for electronic transaction according to a related art consists of a user interface chip 1, a 2G modem 2, a 3G modem 3 and an IrDA transmitter 5.

The 2G modem 2 communicates with a user interface (hereinafter abbreviated UI) chip 1 and performs an electronic transaction on a 2G mobile communication network. The 3G modem communicates with the UI chip 1 and receives user payment information from the USIM 4. The USIM 4 patches the user payment information via the 3G modem 3. And, the IrDA transmitter 5 transmits the user payment information sent from the 3G modem 3 to a credit terminal in an infrared data format.

An electronic transaction process of the above-configured mobile communication terminal according to a related art is provided below with reference to FIG. 2. FIG. 2 is a flowchart of a process of performing an electronic transaction in a mobile communication terminal according to a related art. As shown, if a user requests to perform an electronic transaction using the mobile communication terminal shown in FIG. 1, the UI chip 1 turns on the 2G and the 3G modem.

In one case, the 3G modem 2 is turned on (S1). Subsequently, the 3G modem reads user payment information from the USIM 4 (S2). Meanwhile, the IrDA transmitter 5 having received the user payment information from the 3G modem 3 transmits the user payment information to the credit terminal 6 in an infrared data format (S3). The credit terminal 6 then processes the corresponding electronic transaction using the user payment information received from the IrDA transmitter 5 (S4).

Unfortunately, in performing the electronic transaction using the related art mobile communication terminal on the 2G mobile communication network, since the 3G modem needs to be turned on as well as the 2G modem, power applied to the mobile communication terminal is wasted and the electronic transaction process is delayed.

SUMMARY OF THE INVENTION

The present invention is directed to a mobile communication terminal for performing an electronic transaction, in which the electronic transaction can be done without using a 3G modem for performing the electronic transaction.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile communication terminal wirelessly coupled to at least one mobile communication network is provided. The mobile communication terminal comprising a memory for storing user payment information; a first modem for communicating over a first mobile communication network to provide the user payment information to the memory; a second modem for a communicating over a second mobile communication network to read the user payment information from the memory, when performing an electronic transaction over the second mobile communication network; and a transmitter for transmitting the user payment information in a wireless data format, wherein power applied to the first modem is changed from a first state to a second state after providing the user payment information to the memory.

The payment information is stored in the memory during initialization of the mobile communication terminal. In one embodiment, the mobile communication terminal comprises a universal subscriber identity module (USIM) to patch the user payment information. The first modem receives the user payment information from the USIM. Power of the first modem is turned off after providing the user payment information to the memory. The memory can be a flash memory.

In one embodiment, a user interface (UI) chip is included having a key operated by a user to control the second modem to read the user payment information from the memory, in response to the key being pressed. The user interface chip stores the user payment information provided via the first modem. The user interface chip switches a connection between the transmitter and at least one of the first modem and the second modem. The transmitter can be an IrDA transmitter.

In accordance with another embodiment, a method for processing a transaction using a mobile communication terminal wirelessly coupled to at least one mobile communication network is provided. The method comprises storing user payment information in a memory of the mobile communication terminal; communicating over a first mobile communication network using a first modem to provide the user payment information to the memory; communicating over a second mobile communication network using a second modem to read the user payment information from the memory, when performing an electronic transaction over the second mobile communication network; and transmitting the user payment information in a wireless data format using a transmitter, wherein the payment information is stored in the memory during initialization of the mobile communication terminal, wherein power applied to the first modem is changed from a first state to a second state after providing the user payment information to the memory.

The method further comprises patching the user payment information using a universal subscriber identity module (USIM), wherein the first modem receives the user payment information from the USIM. The method further comprises turning off the first modem after providing the user payment information to the memory. The method may further comprise the second modem reading the user payment information from the memory, in response to a key being pressed, wherein the key operates a user interface (UI) chip controlling the second modem.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

Reference will now be made in detail to the preferred embodiments of the present invention, examples of which are illustrated in the accompanying drawings. Wherever possible, the same reference numbers are used throughout the drawings to refer to the same or equivalent elements.

DETAILED DESCRIPTION OF THE INVENTION

In accordance with one embodiment of the invention, a mobile communication terminal supports an electronic transaction via different communication networks. In the following, an exemplary system and method for supporting the electronic transaction using communications via 2G ($2^{nd}$ generation) and 3G ($3^{rd}$ generation) mobile communication networks is provided.

Figure 1:
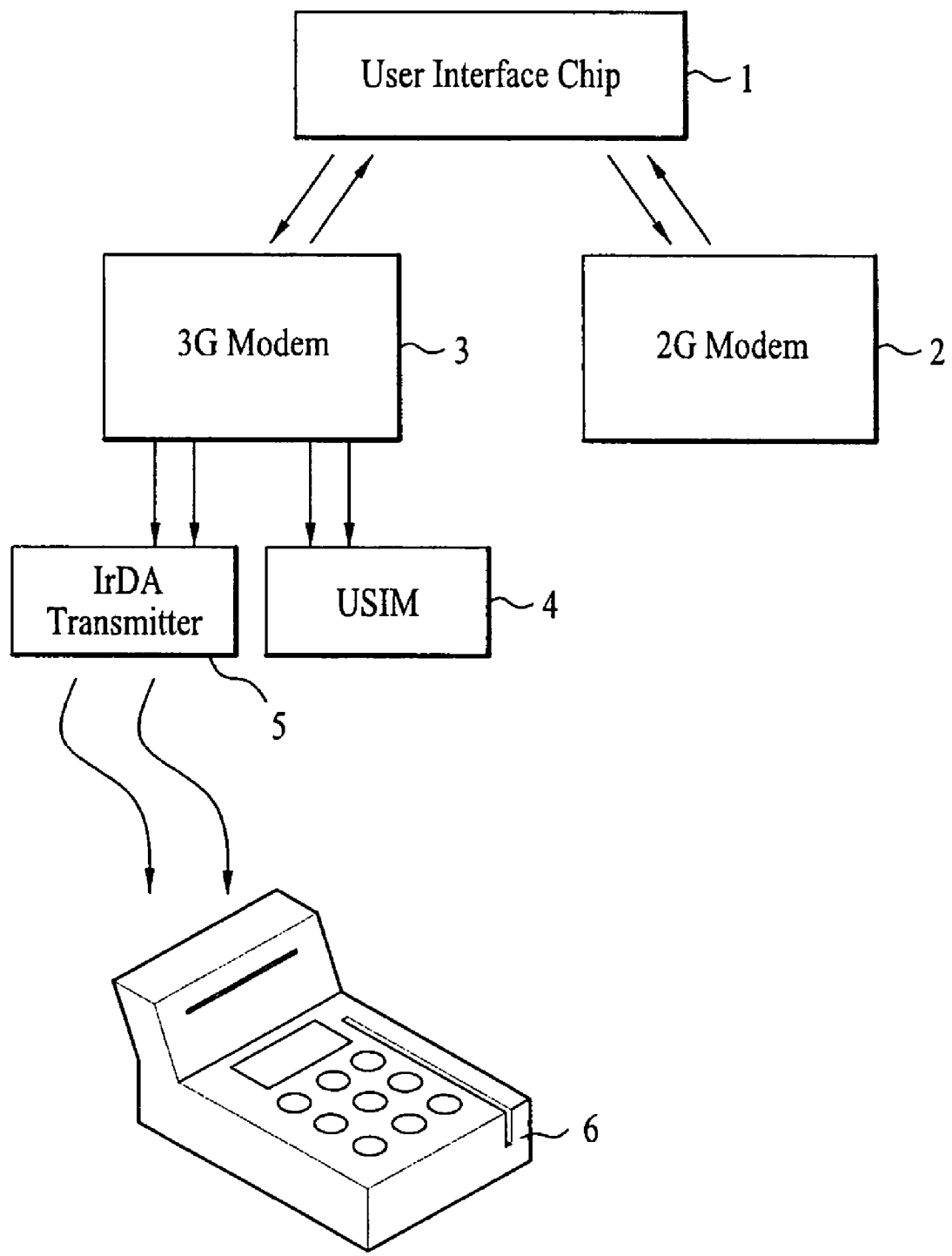
FIG. 1 is a block diagram of a mobile communication terminal for electronic transaction according to the related art.
Figure 2:
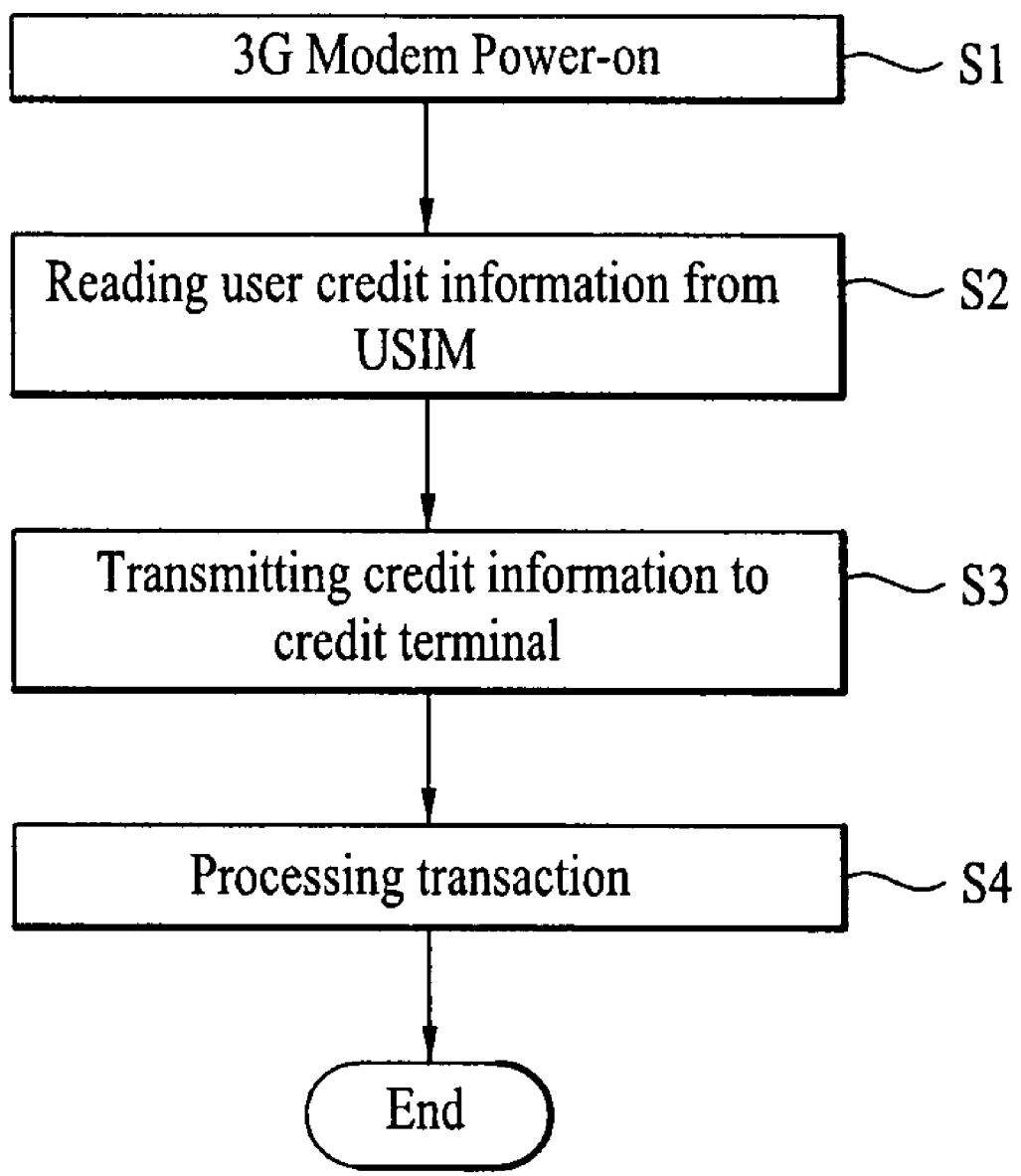
FIG. 2 is a flowchart of a process of performing an electronic transaction in a mobile communication terminal according to the related art.
Figure 3:
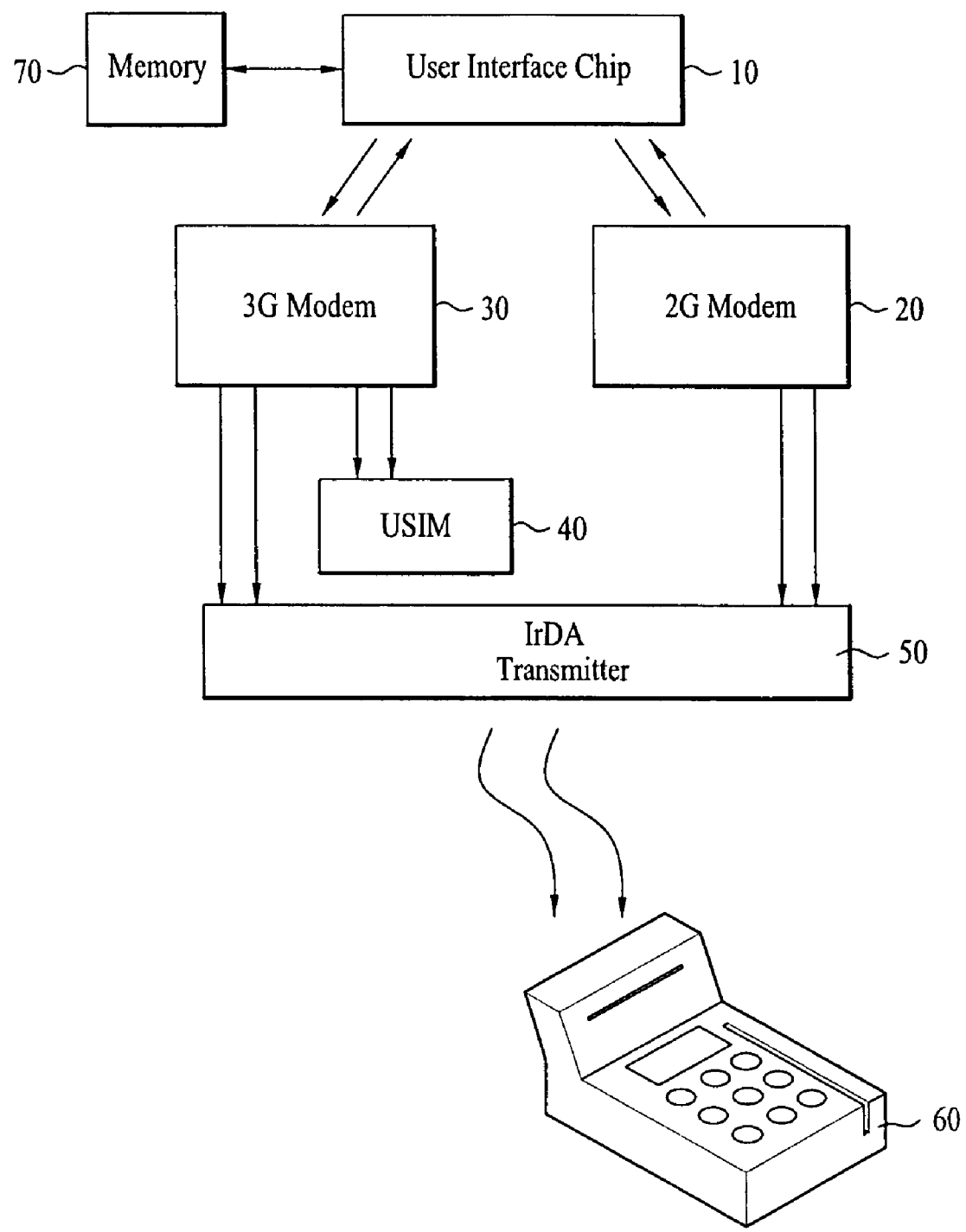
FIG. 3 is a block diagram of a mobile communication terminal configured for servicing an electronic transaction, according to one embodiment of the invention.

Referring to FIG. 3, a mobile communication terminal for electronic transaction according to one embodiment of the invention comprises a UI (i.e., user interface) chip 10, a memory 70 (e.g., coupled to or incorporated in the UI chip 10), a 2G modem 20, a 3G modem 30, a USIM 40 and an IrDA transmitter 50.

The memory 70 stores user's payment information. The memory 70 may be a flash memory or other medium for storing electronic data. The user's payment information may comprise a credit card number, for example.

In a preferred embodiment, the UI chip 10 receives the user's payment information stored in the USIM 40 via the 3G modem 30 when the mobile communication terminal is initialized. The user's payment information can be stored in the memory 70, for example.

The UI chip 10, preferably, comprises a key operable by the user. If the user presses the key, the UI chip 10 controls the 2G modem 20 to read the user payment information stored in the memory 70.

In one embodiment, during initialization (e.g., booting) of the mobile communication terminal, the 2G and 3G modems are temporarily turned on. The mobile communication terminal is initialized, for example, by way of a boot operation. Since the 2G and 3G modems are turned on during initialization, the user payment information can be received from the USIM 40 via a corresponding modem, and preferably, via the 3G modem 30.

In a preferred embodiment, when the mobile communication terminal is booted, the UI chip 10 stores the user payment information provided by the USIM 40, in its memory 70, via the 3G modem 30, for example. The 2G modem 20 communicates with the UI chip 10 and performs a communication for the electronic transaction on a 2G mobile communication network.

Preferably, the 2G modem 20 reads the user payment information from the memory 70 of the UI chip 10 to perform the electronic transaction on the 2G mobile communication network. The 2G modem 20 then transmits the read user payment information to the IrDA transmitter 50.

In one embodiment, the 3G modem 30 communicates with the UI chip 10 and receives user payment information from the USIM 40 and stores it in the memory 70 of the UI chip 10, when the mobile communication terminal is initialized.

After the 3G modem 30 has provided the user payment information to the memory 70 via communication with the UI chip 10 and via communication with the USIM 40, power of the 3G modem 30 is turned off. In a preferred embodiment, the power of the 3G modem 30 is turned off during the electronic transaction via the 2G modem 20 on the 2G mobile communication network.

The USIM 40 preferably is used to provide the payment information of the user of the mobile communication terminal. The IrDA transmitter 50 is connected to the 2G and 3G modems. Preferably, each of the 2G and 3G modems is connected to the IrDA transmitter 50 by a switching system. The IrDA transmitter 50 transmits the user payment information read from the memory 70 by the 2G modem 20 to the credit terminal 60 using infrared data format.

In one embodiment, the IrDA transmitter 50 is connected to both of the 2G and 3G modems, preferably, simultaneously. The connections to the modems 20 and 30 are switched by the UI chip 10. Preferably, the UI chip 10 switches a connection between the IrDA transmitter 50 and either the 2G or 3G modem. Hence, the UI chip 10 performs the switching control so that the data inputted via either the 2G or 3G modem can be transmitted in infrared data format via either the 3G or 2G modem, for example.

Figure 4:
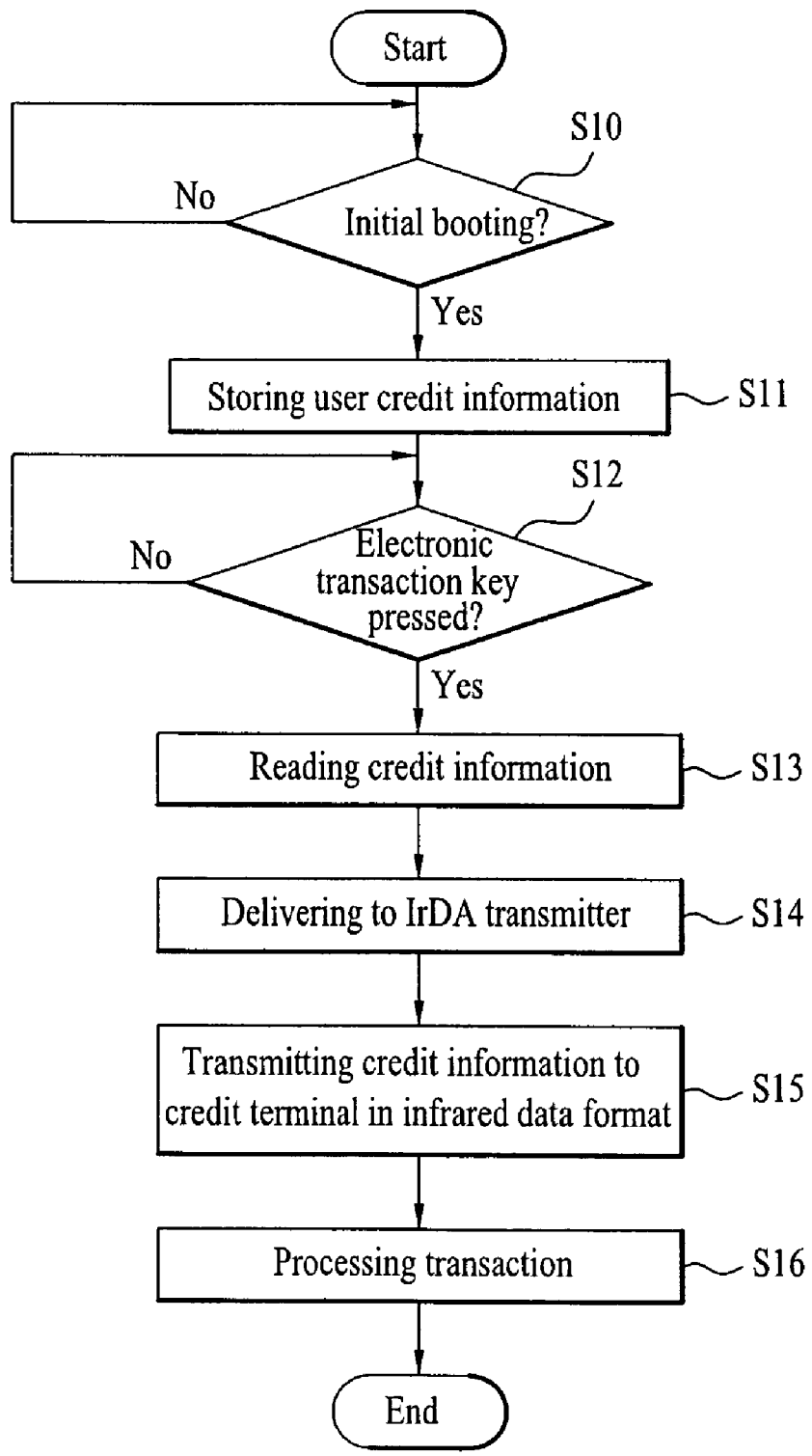
FIG. 4 is a flowchart of a process for performing an electronic transaction in a mobile communication terminal according to one embodiment of the present invention.

In one embodiment, the credit terminal 60 performs the electronic transaction using the payment information received from the IrDA transmitter 50. FIG. 4 is a flowchart of a process of performing an electronic transaction in a mobile communication terminal according to one embodiment of the invention. As illustrated, when the terminal is initially booted, the user payment information is stored in the memory 70 of the UI chip 10 (S10, S11). If previous payment information is stored in the memory 70, the payment information can be updated with new payment information, for example.

The UI chip 10 and the USIM 40 are connected to each other via the 3G modem 30 that is temporarily turned on, for example, when the mobile communication terminal is initially booted. Via this connection, the UI chip 10 receives the user payment information from the USIM 40 to store in the memory 70.

When the user presses an electronic transaction key, the UI chip 10 reads the latest user payment information stored in the memory 70 (S12, S13). The 2G modem then delivers the read payment information to the IrDA transmitter 50 (S14).

The IrDA transmitter 50 transmits the payment information to the credit terminal 60 in the infrared data format (S15). The credit terminal 60 performs the electronic transaction using the payment information received from the IrDA transmitter (S16).

In the above, one or more embodiments are described as applicable to an IrDA transmitter 50 for the purpose of transmitting the payment information in the infrared data format. It should be noted, however, that the present invention is also applicable to an electronic transaction employing any short-range wireless data communication technology such as IEEE 802.11, Bluetooth and the like.

Accordingly, in performing the electronic transaction using the mobile communication terminal on the 2G mobile communication network, the power of the 2G modem of the mobile communication terminal is turned on and the power of the 3G modem of the mobile communication terminal is turned off. Thus, the present invention reduces the power consumption of the mobile communication terminal. Further, the present invention can reduce an overall time taken to perform the electronic transaction.

It will be apparent to those skilled in the art that various modifications and variations can be made in the present invention without departing from the spirit or scope of the inventions. Thus, it is intended that the present invention covers the modifications and variations of this invention defining the scope of the appended claims and their equivalents.

What is claimed is:

1. A mobile communication terminal for processing an electronic payment transaction using a mobile communication network, the mobile communication terminal comprising:
    a memory for storing user payment information;
    a first modem for communicating over a first mobile communication network, the first modem configured to provide the user payment information to the memory;
    a second modem for a communicating over a second mobile communication network, the second modem configured to obtain the user payment information from the memory when performing an electronic transaction over the second mobile communication network;
    a transmitter for transmitting the user payment information in a wireless data format, wherein power applied to the first modem is changed from a first state to a second state as the result of providing the user payment information to the memory; and
    a user interface (UI) chip having a key, the key used to control the second modem, the UI chip configured to read the user payment information from the memory in response to user input received via the key,
    wherein the UI chip is further configured to switch a connection between the transmitter and the first modem or the second modem.

2. The mobile communication terminal of claim 1, wherein the payment information is stored in the memory during initialization of the mobile communication terminal.

3. The mobile communication terminal of claim 1, further comprising a universal subscriber identity module (USIM) to patch the user payment information.

4. The mobile communication terminal of claim 3, wherein the first modem is additionally for receiving the user payment information from the USIM.

5. The mobile communication terminal of claim 1, wherein the second state is off.

6. The mobile communication terminal of claim 1, wherein the memory is a flash memory.

7. The mobile communication terminal of claim 1, wherein the UI chip is further configured to store the user payment information provided via the first modem.

8. The mobile communication terminal of claim 1, wherein the transmitter is an IrDA transmitter.

9. A method of processing a transaction using a mobile communication terminal, the method comprising:
    storing user payment information in a memory of the mobile communication terminal;
    communicating over a first mobile communication network using a first modem of the mobile communication terminal and providing the user payment information to the memory;
    communicating over a second mobile communication network using a second modem of the mobile communication terminal and reading the user payment information from the memory when performing an electronic transaction over the second mobile communication network;
    transmitting the user payment information in a wireless data format using a transmitter of the mobile communication terminal; and
    controlling the second modem to obtain the user payment information from the memory, in response to user input received via a key of the mobile communication terminal, wherein the key operates a user interface (UI) chip controlling the second modem,
    wherein power applied to the first modem is changed from a first state to a second state as the result of providing the user payment information to the memory, and wherein the UI chip is configured to switch a connection between the transmitter and the first modem or the second modem.

10. The method of claim 9, wherein the payment information is stored in the memory during initialization of the mobile communication terminal.

11. The method of claim 9, further comprising patching the user payment information using a universal subscriber identity module (USIM).

12. The method of claim 11, wherein the first modem receives the user payment information from the USIM.

13. The method of claim 11, wherein the second state is off.

14. The method of claim 9, wherein the memory is a flash memory.

15. The method of claim 9, wherein the UI chip is further configured to store the user payment information provided via the first modem.

16. The method of claim 9, wherein the transmitter is an IrDA transmitter.

* * * * *